United States Patent
Chien

(10) Patent No.: US 8,625,056 B2
(45) Date of Patent: Jan. 7, 2014

(54) LIQUID CRYSTAL DISPLAY

(75) Inventor: Shih-Che Chien, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 36 days.

(21) Appl. No.: 13/490,466

(22) Filed: Jun. 7, 2012

(65) Prior Publication Data

US 2012/0242932 A1 Sep. 27, 2012

Related U.S. Application Data

(62) Division of application No. 12/348,414, filed on Jan. 5, 2009, now Pat. No. 8,218,109.

(30) Foreign Application Priority Data

Jun. 24, 2008 (CN) .......................... 2008 1 0302286

(51) Int. Cl.
*G02F 1/1335* (2006.01)

(52) U.S. Cl.
USPC .............. 349/104; 349/12; 349/106; 345/173

(58) Field of Classification Search
USPC ......... 349/12, 104, 106, 62, 65, 68, 113, 114; 345/173; 362/97.2
See application file for complete search history.

(56) References Cited

U.S. PATENT DOCUMENTS

| 6,317,180 | B1 * | 11/2001 | Kuroiwa et al. | 349/96 |
| 6,677,934 | B1 * | 1/2004 | Blanchard | 345/175 |
| 7,274,424 | B1 | 9/2007 | Kurihara et al. | |
| 7,372,510 | B2 * | 5/2008 | Abileah | 349/12 |
| 7,508,466 | B2 * | 3/2009 | Hutchins | 349/61 |
| 2005/0185112 | A1 * | 8/2005 | Hara | 349/61 |
| 2006/0109463 | A1 | 5/2006 | Boef et al. | |

FOREIGN PATENT DOCUMENTS

| CN | 1613028 A | 5/2005 |
| TW | 200719010 A | 5/2007 |

* cited by examiner

*Primary Examiner* — Thoi Duong
(74) *Attorney, Agent, or Firm* — Altis Law Group, Inc.

(57) ABSTRACT

A liquid crystal display includes a first flat glass substrate, an opposite second flat glass substrate, a liquid crystal layer sandwiched therebetween, a backlight module disposed adjacent to the first flat glass substrate, a color filter disposed adjacent to the second flat glass substrate, a bandpass filter member disposed on the color filter. The bandpass filter member is configured for allowing light of a given spectrum emitted from the backlight module to pass therethrough and blocking light that is not in the given spectrum from passing therethrough, and a touch panel disposed adjacent to the bandpass filter member.

13 Claims, 3 Drawing Sheets

LIQUID CRYSTAL DISPLAY

BACKGROUND

1. Technical Field

The present disclosure generally relates to a liquid crystal display, and particularly relates to a liquid crystal display having a mirror function.

2. Discussion of Related Art

Liquid crystal displays (LCD) are extensively employed in various electronic devices, such as mobile phones, televisions, etc. In addition to portable devices such as the mobile phones, many people may also carry a mirror with them for activities such as applying make-up. Or when at home, people may have both a television and a mirror, it would be space-saving and convenient if an LCD device also had a mirror function.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of embodiments. Moreover, in the drawings, like reference numerals designate corresponding parts throughout the different views.

DETAILED DESCRIPTION

Figure 1:
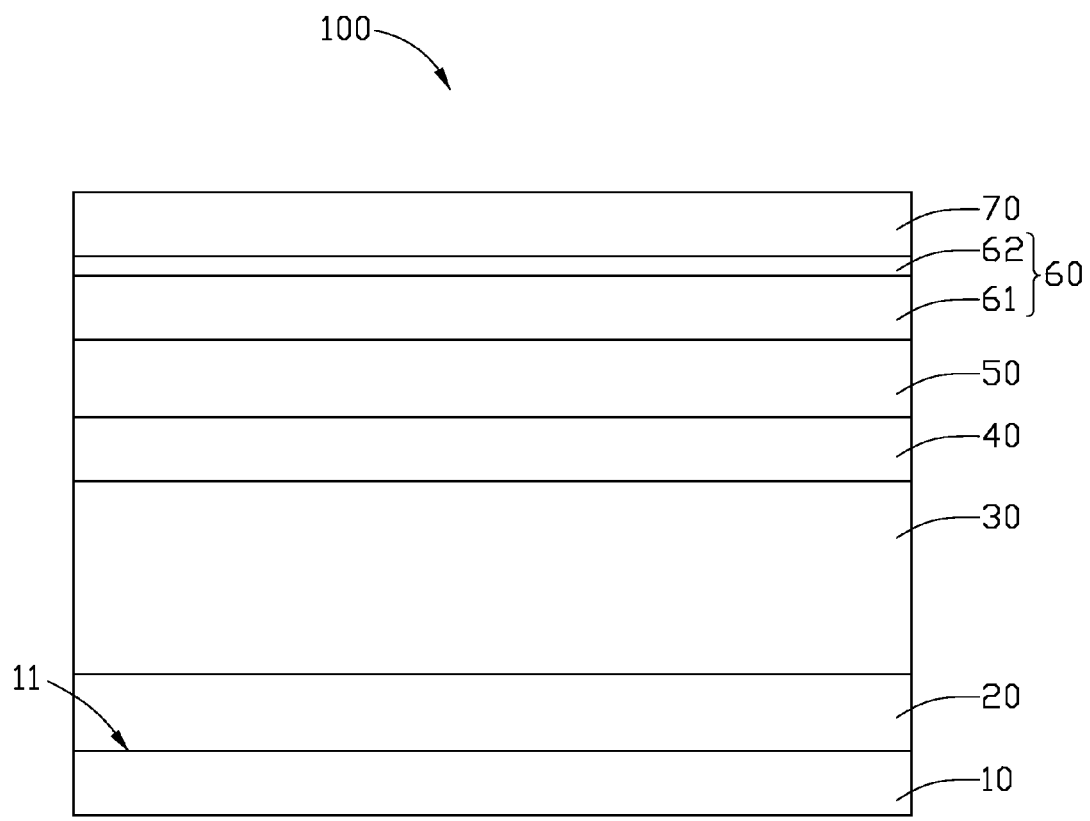
FIG. 1 is a cross-section view of a liquid crystal display including a bandpass filter member in accordance with a first embodiment.
Figure 2:
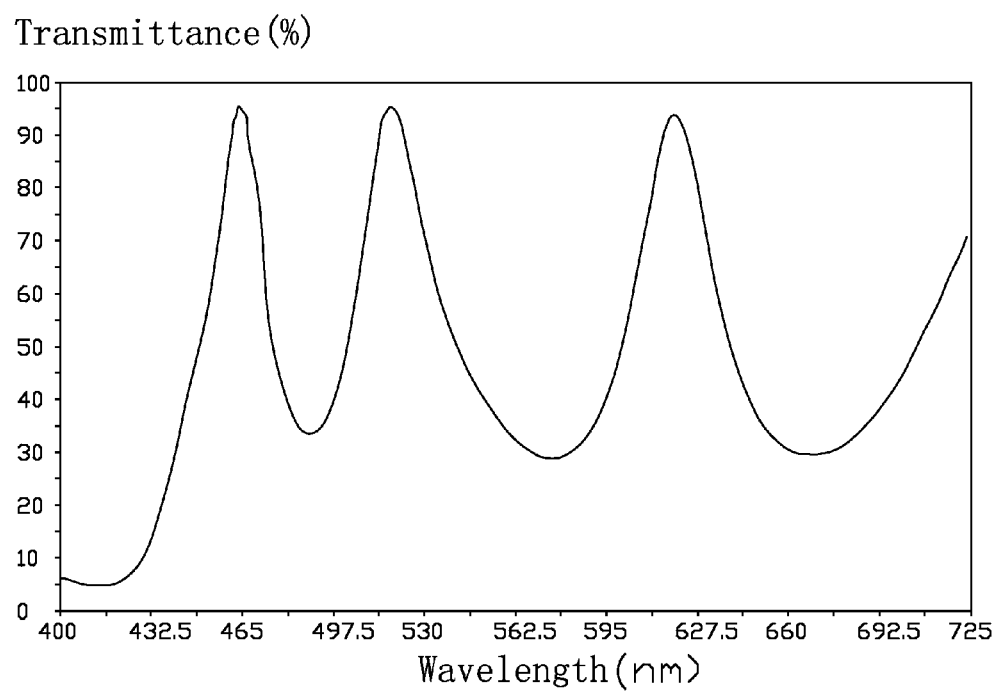
FIG. 2 shows a transmittance spectrum of the bandpass filter member.

Referring to FIG. 1, a liquid crystal display (LCD) 100 provided in a first embodiment includes a backlight module 10, a first flat glass substrate 20, a second flat glass substrate 40, a liquid crystal layer 30, a color filter 50, a bandpass filter member 60 and a touch panel 70, which are sequentially arranged in the order written, along a transmission direction of the light emitted from the backlight module 10.

The backlight module 10 can be a known liquid emitting diode light resource, including a light emitting surface 11, configured for emitting white light beams comprised of red, green, and blue light beams, to the liquid crystal layer 30 through the first flat glass substrate 20. The first flat glass substrate 20 contacts the emitting surface 11 of the backlight module 10. The second flat glass substrate 40 is opposite to the first flat glass substrate 20. The liquid crystal layer 30 is sandwiched between the first and second flat glass substrates 20, 40, including a plurality of liquid crystal molecular (not shown) and two opposite transparent electrodes (not shown). The liquid crystal is sandwiched between the two electrodes. The color filter 50 is disposed on a surface of the second flat glass substrate 40, and is configured for converting white light beams transmitted therethrough into red light beams, green light beams, and blue light beams. The red, the green, and the blue light beams are used to irradiate the touch panel 70 thereby displaying color images.

The bandpass filter member 60 is disposed on a surface of the color filter 50. The bandpass filter member 60 includes a transparent plate 61 and a bandpass filter film 62 formed thereon. The bandpass filter film 62 faces the touch panel 70, and includes a number of (e.g., 15 to 22) alternately arranged first and second layers (not shown). The bandpass filter film 62 is configured for allowing light of a given spectrum emitted from the backlight module 10 to pass therethrough, and blocking light that is not in the given spectrum from passing therethrough. Thus, all the light beams emitted from the backlight module 10 and then passing through the color filter 50 can pass through the bandpass filter 62. The first layers are comprised of a first material and the second layers are comprised of a second material. A refractive index of the first material is in a range from 2.1 to 2.5; and a refractive index of the second material is in a range from 1.3 to 1.5. The first material is selected from a group consisting of $Ta_2O_5$, $TiO_2$, $Ti_3O_5$, and $Nb_2O_5$. The second material can be $SiO_2$. In addition, the transparent plate 61 can be omitted. In this situation, the bandpass filter film 62 is directly formed on the surface of the color filter 50.

The touch panel 70 is configured for sensing operation of a user and displaying images according to instructions of a controller (i.e., a CPU of an electronic device) and displaying color images. As such, the touch panel 70 is capable of displaying handwriting of a user. Therefore, the liquid display 100 achieves a function of an electronic notebook/blackboard.

In the embodiment, when the backlight module 10 emits white light beams, the bandpass filter member 60 entirely transmits the white light beams to the touch panel 70, and the touch panel 70 displays color images. When the backlight module 10 does not emit light beams, an entire surface of the touch panel 70 reflects the external light beams irradiated thereon except for the red, green, and blue light included therein, and the liquid crystal display 100 achieves a mirror function.

Figure 3:
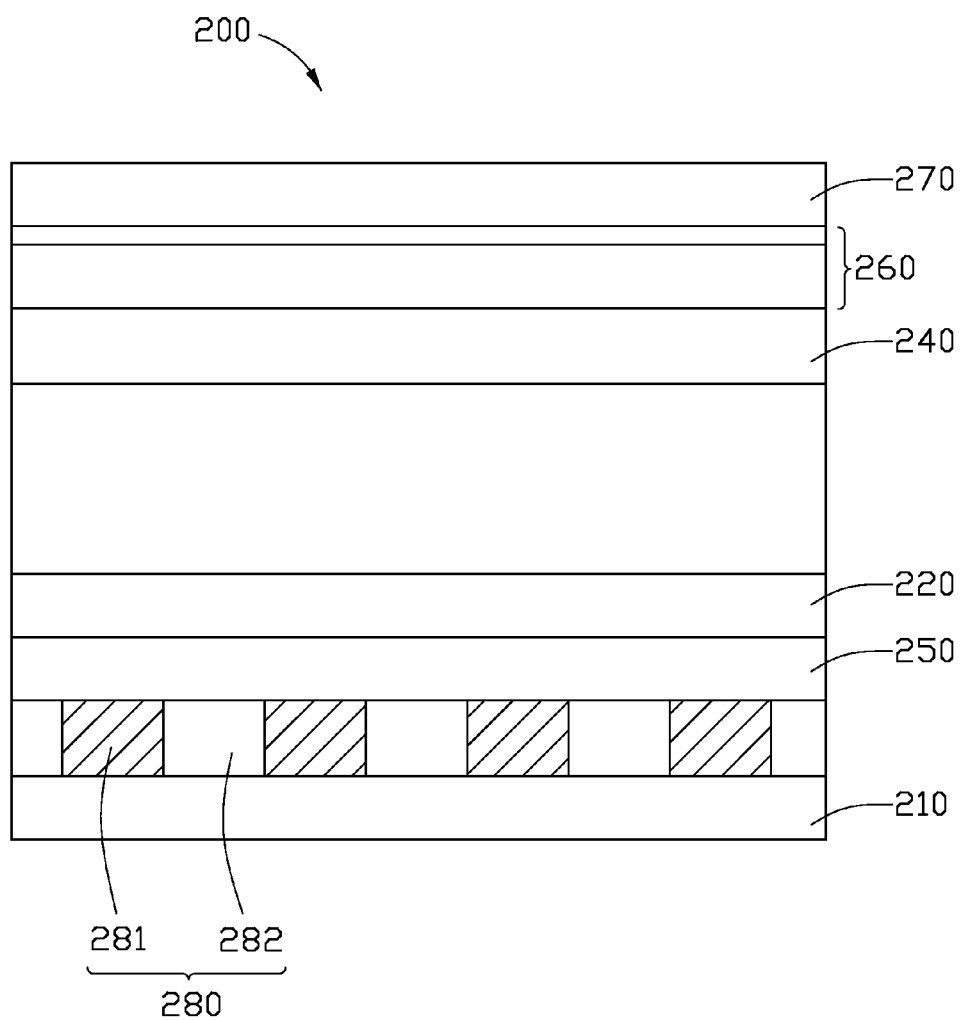
FIG. 3 is a cross-section view of a liquid crystal display in accordance with a second embodiment.

Referring to FIG. 3, another liquid crystal display 200 of a second embodiment is provided, differing from the previous embodiment in further inclusion of a transreflective layer 280 including a number of reflecting regions 281 and transmitting regions 282. The reflecting regions 281 and the transmitting regions 282 are alternately arranged. The reflecting regions 281 reflect light beams irradiated thereon such that the LCD 200 can display images even without a backlight module. The transmitting region 282 is capable of transmitting the light beams emitted from the backlight module 210 such that the LCD 200 can display a high brightness image under the irradiating of the backlight beams. In this embodiment, each reflecting region 281 includes a plurality of nanoparticles disposed on a reflecting surface (not shown) thereof to improve a reflective index thereof. Furthermore, the color filter 250 is sandwiched between the first flat glass substrate 220 and the reflecting layer. The bandpass filter member 260 is disposed between the second flat glass substrate 240 and the touch panel 270.

While certain embodiments have been described and exemplified above, various other embodiments will be apparent to those skilled in the art from the foregoing disclosure. The present disclosure is not limited to the particular embodiments described and exemplified but is capable of considerable variation and modification without departure from the scope of the appended claims.

What is claimed is:

1. A liquid crystal display, comprising:
   a first flat glass substrate, an opposite second flat glass substrate, and a liquid crystal layer sandwiched therebetween;
   a backlight module disposed adjacent to the first flat glass substrate;
   a color filter disposed between the first flat glass substrate and the backlight module;

a bandpass filter member disposed on the second flat glass substrate, the bandpass filter member being configured for allowing a light of a given spectrum emitted from the backlight module to pass therethrough, and blocking light that is not in the given spectrum from passing therethrough; and a touch panel disposed adjacent to the bandpass filter member;

wherein the bandpass filter member is further configured for allowing light of the given spectrum emitted from outside of the liquid crystal display to pass therethrough, and reflecting light emitted from outside of the liquid crystal display that is not in the given spectrum, such that when the backlight module is turned off, the light from outside of the liquid crystal display passes through the touch panel and reaches the bandpass filter member, and the bandpass filter member reflects the light that is not in the given spectrum so as to make the liquid crystal display achieve a mirror function.

2. The liquid crystal display as claimed in claim 1, wherein the bandpass filter member comprises a bandpass filter film including a number of alternately arranged first and second layers, and the bandpass filter film is proximate to the touch panel.

3. The liquid crystal display as claimed in claim 2, wherein the first layers are comprised of a first material, a refractive index of the first material is ranged from 2.1 to 2.5, the second layers are comprised of a second material, and a refractive index of the second material is ranged from 1.3 to 1.5.

4. The liquid crystal display as claimed in claim 3, wherein the first material is selected from a group consisting of Ta2O5, TiO2, Ti3O5, and Nb2O5, and the second material is SiO2.

5. The liquid crystal display as claimed in claim 1, wherein the bandpass filter member comprises a transparent substrate and a bandpass filter film formed on a surface of the transparent substrate, and the bandpass filter film is adjacent to the touch panel and includes a number of alternately arranged first and second layers.

6. The liquid crystal display as claimed in claim 5, wherein the first layers are comprised of a first material, a refractive index of the first material is ranged from 2.1 to 2.5, the second layers are comprised of a second material, and a refractive index of the second material is ranged from 1.3 to 1.5.

7. The liquid crystal display as claimed in claim 6, wherein the first material is selected from a group consisting of Ta2O5, TiO2, Ti3O5, and Nb2O5, and the second material is SiO2.

8. The liquid crystal display as claimed in claim 1, further comprising a transflective layer disposed between the first flat glass substrate and the backlight module, the transflective layer including a number of alternately arranged reflecting regions and transmitting regions.

9. A liquid crystal display, comprising:
a first flat glass substrate, an opposite second flat glass substrate, and a liquid crystal layer sandwiched therebetween;

a backlight module disposed adjacent to the first flat glass substrate;

a color filter disposed between the first flat glass substrate and the backlight module;

a bandpass filter member disposed on the second flat glass substrate, the bandpass filter member being configured for allowing a light of a given spectrum emitted from the backlight module to pass therethrough, and blocking light that is not in the given spectrum from passing therethrough; and a touch panel disposed adjacent to the bandpass filter member;

wherein the bandpass filter member is capable of reflecting external light that is not in the given spectrum, and allowing external light that is in the given spectrum to pass therethrough, such that when no light is emitted from the backlight module, the external light passes through the touch panel and reaches the bandpass filter member, and the bandpass filter member reflects the external light that is not in the given spectrum, so that the liquid crystal display achieves a mirror function.

10. The liquid crystal display of claim 9, wherein the bandpass filter member comprises a bandpass filter film formed by a number of alternately arranged first and second layers, and the bandpass filter film is directly formed on a surface of the color filter that is away from the liquid crystal layer.

11. The liquid crystal display of claim 10, wherein the first layers are comprised of a first material, a refractive index of the first material is ranged from 2.1 to 2.5, the second layers are comprised of a second material, and a refractive index of the second material is ranged from 1.3 to 1.5.

12. The liquid crystal display of claim 11, wherein the first layers are comprised of a first material, a refractive index of the first material is ranged from 2.1 to 2.5, the second layers are comprised of a second material, and a refractive index of the second material is ranged from 1.3 to 1.5.

13. The liquid crystal display of claim 9, wherein the bandpass filter member comprises a bandpass filter film and a transparent plate, the transparent plate is formed on a surface of the color filter that is away from the liquid crystal layer, and the bandpass filter film is formed on the transparent plate.

* * * * *